Nov. 14, 1933.  G. LANGFORD  1,935,473
REFORMING RAIL JOINT BARS
Filed Feb. 23, 1932   2 Sheets-Sheet 1

Inventor
George Langford,
By S. P. Wolhaupter
his Attorney

Nov. 14, 1933.  G. LANGFORD  1,935,473
REFORMING RAIL JOINT BARS
Filed Feb. 23, 1932   2 Sheets-Sheet 2

George Langford,

Patented Nov. 14, 1933

1,935,473

UNITED STATES PATENT OFFICE 1,935,473

REFORMING RAIL JOINT BARS

George Langford, Joliet, Ill., assignor to McKenna Process Company of Illinois, Joliet, Ill., a corporation of Illinois Application February 23, 1932. Serial No. 594,698

8 Claims. (Cl. 29—169)

The present invention pertains to rail joints for railway tracks, and more particularly to a method of reforming worn rail joint bars so that they may be used again, being directed primarily to a restoring of the worn fishing surfaces of angle types of bars, or to bars wherein the top and bottom members differ materially in cross-sectional shape.

In the use of the method of the present invention, the cross-sectional shape of the bar is to be considered. The contour presents variously inclined surfaces to the reforming pressure, resulting in variously directed reactions to this pressure, so that it is difficult to maintain the desired pressure on each part of the bar. The pressure designed to reform the top fishing surface is affected by lateral pressure reacting from the reforming of the bottom fishing surface; and vice versa. Accordingly, the purpose of the present invention is to attain an angular positioning of the bar with reference to the direction of the reforming pressure, which will result in a balance of lateral pressure reactions, whereby both the top and bottom members of a bar may have the reforming pressure distributed upon them so as to properly restore their respective fishing surfaces.

It is important to note that in general, the reforming of a worn bar is essentially a reforming of its worn fishing surfaces. Changes may be made in the sectional shape, but the main concern is the proper restoration of each worn fishing surface to a smooth finish and correct height and angle. As the top of head fishing surface is the one generally most worn, reforming may be concentrated upon this part but at the expense of the bottom fishing surface, particularly because in an angle bar it is difficult to apply reforming pressure directly to the extended flange. However, the restoration of both fishing surfaces is desirable, and so one fishing surface should not be reformed at the expense of the other.

In reforming, a bar may be considered as essentially of two parts; top and bottom. Changes in the application of pressure upon one must be watched carefully for they will probably affect the other, by lateral reactions. Therefore, a principal object of the present invention is to balance the lateral reactions by angular positioning of the bar to the reforming pressure, without recourse to means other than positioning to attain lateral balance.

Another object is to maintain accuracy of fishing height in the reformed bar while securing a desired angular positioning. These and other objects will appear from the following description and from the drawings wherein.

Figure 2:
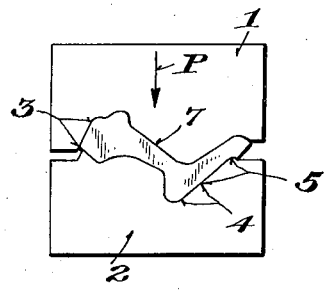
Figure 2 is an end view like Figure 1 illustrating an application of the method of the present invention.
Figure 3:
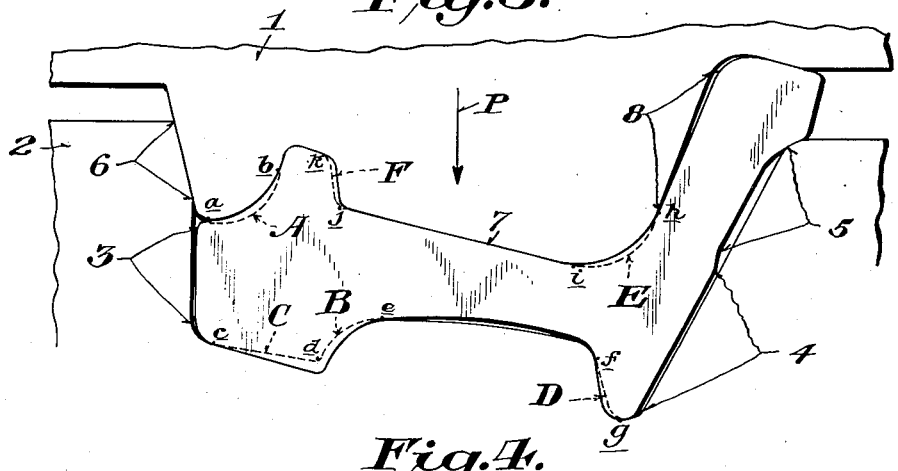
Figure 3 is an end view enlarged of a pair of dies showing only the working profiles of the dies, this being a method employed in the prior art.
Figure 4:
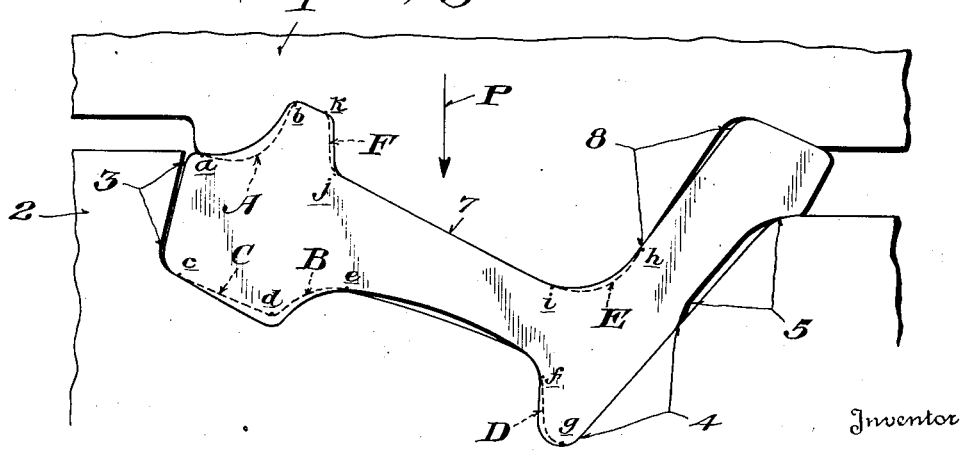

Figure 4, an end view similar to Figure 3, illustrates the method of the present invention, differing in its application from the method of Figure 2.

Figure 5:
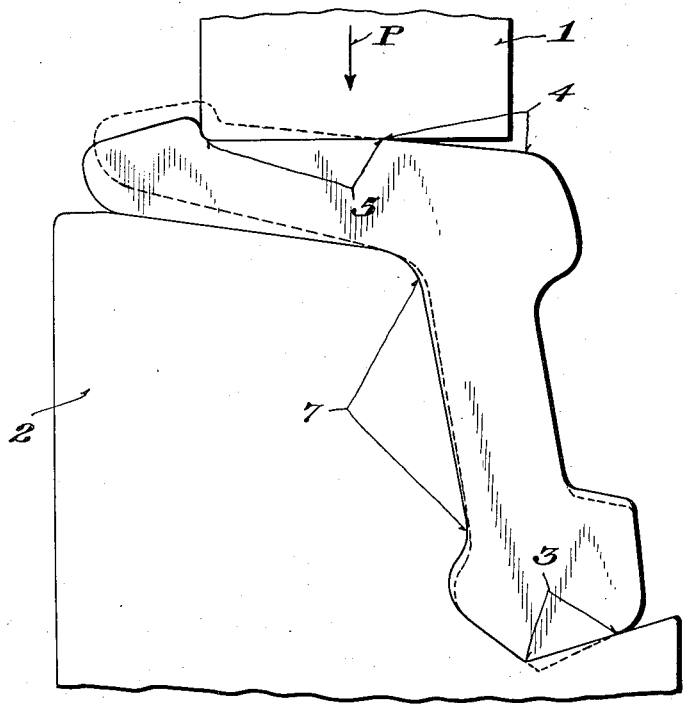

Figure 5 is an end view of a pair of reforming die profiles closed upon a bar, illustrating my invention employed as a preliminary reforming operation.

Figure 6:
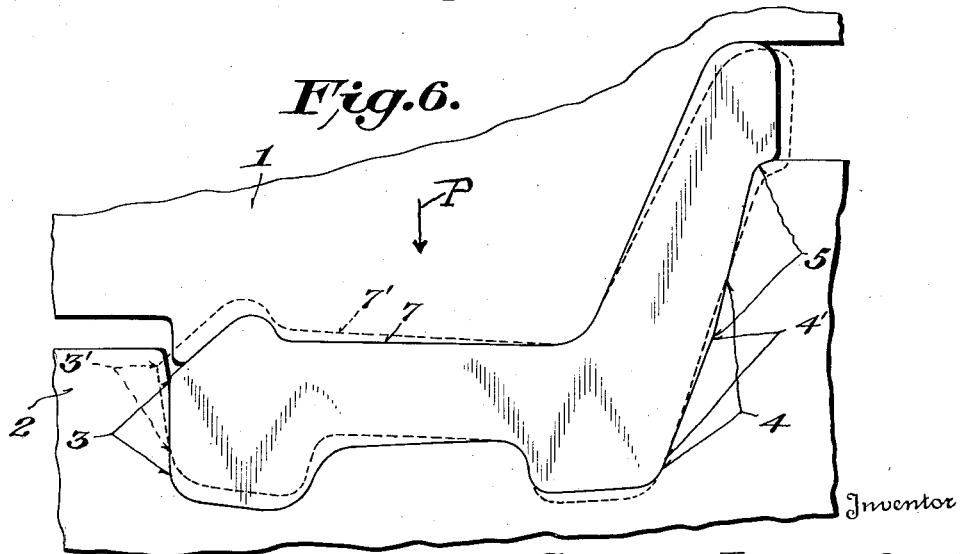

Figure 6 is an end view of a pair of reforming die profiles closed upon a bar, this being an operation supplementary to that of Fig. 5.

For sake of clarity the same reference numerals and letters are employed in the various figures of the drawings to indicate corresponding faces and locations on the joint bar and in the dies.

Figure 1:
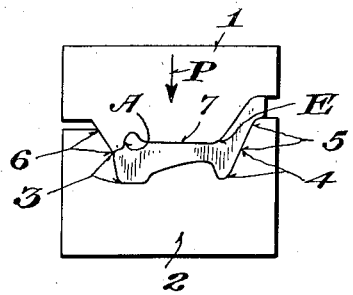
Figure 1 is an end view of a pair of closed dies illustrating a method of bar reforming employed in the prior art.

Referring first to the example of a known reforming method illustrated in Fig. 1 of the drawings the top die 1 is shown closed upon a bottom die 2, thereby defining a cavity conforming to the section of angle bar to be reformed, and said Figure 1 illustrates the teaching of my Patent #1,808,466, issued June 2, 1931, wherein means 6, as for instance, an inclined surface, is provided to effect a lateral pressure against the extended flange or bottom member of the bar so as to properly reform the flange or bottom surface 4. In this figure, the bottom die 2 is fixed, and the top die moves vertically, the main pressure being initially applied in the direction of the arrow P. The outer face 7 of the bar web is horizontal or at right angles to the line of moving die travel. As the top and bottom fishing surfaces 3 and 4 respectively are about 14 degrees plus in most of the bars now commonly used, the corresponding die surfaces at locations 3 and 4 are angled 14 degrees plus to the direction of initially applied pressure or die travel P.

In a worn bar, it is essential that the fishing surfaces 3 and 4 be properly restored, and so the pressure is directed mainly upon the top and bottom bar members, the web member being more or less untouched. This pressure, because of the shape of the bar section, necessarily encounters inclined surfaces so that as the dies close, lateral components of the reactions A and E, shown in Figure 1, tend to force the top die to the left, and the bottom die to the right, thereby opening the bottom member cavity so that it is not properly draughted, and therefore will not properly reform. To avoid this, means are provided to effect a supplementary lateral thrust to oppose the lateral components reacting to the reforming pressure. Any supplementary lateral thrust means may be employed which accomplishes this object, but the preferred means is the angular "lock" 6 above referred to and which consists of angularly positioned matched surfaces which engage each other as the dies close, forcing the top die to the right against the reactions A and E so as to secure pressure and draught upon the flanged bottom member of the bar.

The top fishing surface 3 of the bar, indicated in Figure 1 of the drawings, corresponds to the face of a wall in the bottom die, and this wall inclines upward and outward, so that the head portion of the bar may be placed readily in its die groove, and be easily ejected after the bar is reformed. Such a die-groove may be defined as an "open" groove, and dies are ordinarily made this way so that there will be no difficulty in placing the bar in or ejecting it from the die.

In Figure 2 of the drawings is shown one form of the present invention. In this example the bar is so angled to the direction of pressure P that the lateral reactions will balance. The top fishing surface is shown in one die, and the bottom fishing surface is in the other die. It is obvious that such an arrangement permits of so wide a range of angular positioning of the bar, that a position may be found within this range where the lateral reactions will balance. This method is similar to the method of my reissue Patent #18,165, granted August 25, 1931, except that I do not provide means such as 6 in Figure 1 to secure lateral counter-thrust to balance the lateral reactions. As in Figure 1, surface 3 is so inclined as to provide an "open" groove for the top member of the bar, but the practical objection to such an arrangement is that the top and bottom surfaces 3 and 4 respectively are not in the same die, so that any lateral misalignment would tend to inaccuracy of fishing height in the reformed bars. And yet a bar may be reformed by the method of Figure 2, even without the use of the lateral counter thrust means of Figure 1, if the bar be positioned precisely to the angle that insures a balance of lateral pressure.

In Figure 3 of the drawings is shown a variation of the method of Figure 1. This is an enlarged end view of only the working profiles of a top moving die 1 and affixed bottom die 2. The bar is angularly positioned to the direction of die or pressure travel P, so that the surface 3 is parallel to P. This is the limit of angularity if the surface 3 is to be maintained as a wall of an "open" die groove. To position the bar more angularly, surface 3 would have to be undercut and made overhanging, a procedure which as far as I am aware, has never been practiced in the bar reforming art. The method of Figure 3 provides counter-thrust means to balance lateral pressure, and does not depend for this balance upon the angular positioning even though there is a better balance obtained by the bar positioning in Figure 3 than in Figure 1 if the "lock" means 6 is eliminated.

While there may be occasional bars of such cross-sectional shape that the angular positioning of Figure 3 would suffice to effect a lateral balance of pressure or nearly so without auxiliary means such as 6 of Figure 1, it has been my experience in the reforming of worn bars that few if any are of such shape that the lateral pressures resulting would balance with certainty, and if the positioning of the bar to the direction of pressure P is limited angularly as in Figure 3, auxiliary counter thrust means such as 6 may be necessary to maintain sufficient reforming pressure upon the bottom member or flange of the bar to properly reform the bottom fishing surface, as the dies may yield laterally upon each other if the counter thrust means is not provided.

This does not mean that either die is loosely fastened so as to permit of such movement. The fixed die may be bolted rigidly to the bed of a die press, and the moving die may be fastened rigidly to the reciprocating cross-head, and yet the dies may and doubtless will move laterally upon each other if the lateral pressures from the reactions are unbalanced. This is because of slight play between the sides of the cross-head and the ways on which it slides. The play there may be slight but it is sufficient to permit lateral movement of one die upon the other. The cavity for the bottom member of the bar may on closure just fit the bar member and yet not properly reform it, but in such case, only one-sixty-fourth of an inch more draught upon a surface may be needed to cause movement of metal so as to result in a brightened and restored fishing surface. It is this draughting, which although slight in its amount or depth, properly restores the bottom fishing surface, but because of its extent, a comparatively great lateral pressure results if means such as the lock 6 of Figure 1 is provided to resist the tendency of the dies to yield laterally when the bottom member of the bar is draughted. If the dies are permitted to yield laterally, the bottom member of the bar will not be sufficiently draughted. This lateral yielding of the dies is difficult to detect by mere observation, and in order to determine whether or not there is any lateral yielding and whether sufficient lateral counter-thrust means is provided to insure the slight draughting required, in practice I make such determination by reference to and analysis of the reformed bar itself, which is commonly done by those accustomed to forging, die-shaping and rolling various steel shapes. If the reformed bar has its bottom fishing surface brightened and true to template, it is evident that sufficient counter-thrust means has been provided to balance the lateral resistance to draughting. A dull unfinished surface is evidence that the lateral resistance to draughting the bottom member has not been overcome.

In the reforming of a worn angle bar, the common practice is to so machine the die grooves as to secure reforming pressure upon selected surfaces of the bar. Pressure which merely bears upon a surface without any movement of metal may be distinguished from draughting or reforming pressure which insures movement of metal, and which results in a smoothened and brightened surface.

The draughting of selected surfaces as commonly practiced is shown in Figure 3 by the dotted lined areas. In general most of the reforming is confined to the head member whose fishing surface 3 is more worn than fishing surface 4 of the bottom member. The pressure is applied along a—b of the top outer side of the bar and along c—d and d—e of the top underside. There may also be draughting along k—j of the top outer side.

The bottom member of the bar is draughted in the locations along lines f—g and h—i of Figure 3.

The reforming pressure initially moving in the direction P encounters an inclined surface, and there is a reaction at A tending to force the top die to the left. The same thing happens on surface h—i, and the reactions at A and at E combine to force the top die to the left, the counter-reaction at F to the draught j—k being far insufficient to effect a balance of lateral pressure.

In the bottom die, the effect of the heavy draught along d—e tends to force the bottom die to the right by reaction at B, but as the bottom die is fixed, this reaction communicates through the bar to force the top die to the left. Reaction at D on f—g opposes this, as may reaction at C on c—d to an extremely slight extent, but in general, reaction at B combines with reactions at A and E to force the top die to the left in spite of this particular angular positioning of the bar. As will be noticed, it is not customary to draught the bottom member of the bar at 5 and 8, although in many cases, the outer portion is draughted to a greater extent than is shown along h—i, thereby further unbalancing the pressure laterally and forcing the top die to the left. With the bar limited in angular positioning, as in Figure 3, making surface 3 vertical or parallel to the direction of moving die travel, the lateral pressure reactions as has been shown, are unbalanced so as to force the top die to the left, requiring some means to provide counter lateral thrust, such as the locking surface at 6, whereby the top die forced to the left by the draughting of inclined surfaces, is finally forced to the right as the top and bottom die surfaces engage at 6, as shown in said Figure 3.

Figure 4 illustrates the preferred form of the present invention. While in Figure 3 of the drawings the outer face 7 of the bar web cannot be moved angularly more than 14 degrees plus the amount of head fishing angle and still provide an "open" head die groove, it will be seen that in the plan shown, in Figure 4, the ordinary open die groove is dispensed with in favor of an "undercut" groove, wherein the surface 3 slopes upward and inward, making it possible to greatly increase the range of bar positioning to an extent that will secure lateral pressure balance. To move surface 7 angularly only 14 degrees plus, as in Figure 3, is not enough, but if an undercut head die wall 3 is used as in Figure 4, then it is possible to incline the bar angularly much further and so that the lateral reactions will balance, requiring no means for supplementary lateral thrust as at 6 in Figure 3. Sections of bars vary, and so the proper degree of angularity must be determined by trial in each case, with the knowledge however, that the correct position may be found in the wide range of angularity made possible by this method.

It will be noticed in Figure 4 that the reactions at locations A and E are much more vertical than in Figure 3, so much so that very little counter-draught reaction as at location F is required to secure lateral balance. The bar may angled even more than shown, and the counter reactions at D, and at F and elsewhere may be manipulated to secure balance, these adaptations being readily understandable by those skilled in the art. Preferably means like 6 in Figure 3 may be provided on one or both sides of the die to maintain in lateral alignment, but the important feature is to secure lateral balance or nearly so by angular positioning of the bar in amount that necessitates an undercut die surface at the bar head top surface 3 in Figure 4, with both fishing surfaces in one and the same die, as distinct from the less preferable method of Figure 2 where, although the bar may be placed in proper position angularly, the top and bottom fishing surfaces are not in the same die.

In Figures 1, 2 and 3, the bottom die may be the moving one, and the top die the fixed one, also the dies may be inverted. In Figure 4, however, the moving die must be the top member 1 and the fixed die the bottom member 2, although the position of each die may be inverted. This is not a serious limitation, however, and presents no practical difficulties. The important advantages gained are that the bar is given sufficient range of angular positioning to secure lateral pressure balance, and that the fishing height of the bar is maintained accurately by keeping the top and bottom fishing surfaces in one and the same die.

In bars of the present 14 degrees plus standard fishing angles, if the top fishing surface 3 is parallel to pressure line P as in Figure 3, the bottom fishing surface 4 is at an angle of 28 degrees plus to P. The method of Figure 3 is then limited to a positioning of the bar, wherein the bottom fishing surface is at an angle to P not more than 28 degrees plus which is the sum of the top and bottom fishing angles of the bar. In Figure 4, fishing surface 4 may be placed at a much greater angle to P than 28 degrees plus. The novelty of my invention lies in a positioning of the bar with relation to the line or direction of pressure P at a greater angle than the sum of the top and bottom fishing angles, for although a positioning to attain perfect lateral balance of pressure is preferable, any approach to it beyond such angularity as the method of Figure 3 permits would be an advance over the prior art accomplished in the novel manner of Figure 2 or of Figure 4. The method may be used with press and dies or with any other means that accomplishes the object in the novel manner described, also it may be used in the reforming of new as well as worn bars.

As a step in a method it has great value where bars of one type are reformed into bars of another type, particularly in cases where the various members of the bar are shifted relatively to each other or altered in cross-section. In such cases, not merely the reforming of fishing surfaces but changes in section are involved, so that lateral balance is very difficult to attain. Furthermore changes in section in addition to the reforming of fishing surfaces is very destructive to the die grooves or other means employed to convey pressure to the surfaces of the bar. The method of my invention then becomes useful as a preliminary operation. An example of this application of my method is shown in Figures 5 and 6 where an ordinary worn head contact bar is reformed into a head-free bar.

Figure 5 is an end view of an upper die profile 1 closed upon a fixed lower die 2, the pressure being vertical as shown by the arrow P. The worn head-contact bar section is denoted by dotted lines, and the re-shaped section, approximating the desired reformed head-free section, is in full lines. In this operation it is desired to effect rearrangement of the three members of the bar relatively to each other and to change the fishing angles, so that the bar may be made to correspond as nearly as possible to the dies used in the final operation. In Figure 5, the bar is positioned to the pressure P at an angle greater than the sum of the fishing angles of the bar, the top and bottom fishing surfaces not being in the same die. By this arrangement, the angle of fishing surface 3 is greatly reduced; fishing surface 4 is increased, or at least its surface 5 is greatly reduced in angle to provide rail flange clearance; and surface 7 is increased in angle, this latter not being essential in all cases. The re-shaped section is thus made to approximate the head-free section desired, which in Figure 5 is represented in full lines.

This operation being completed, the bar is then reformed as in Figure 6, the bar section, in dotted lines, before reforming so closely corresponding to die contours that it presents no more difficulties than the reforming of the bar to its original head contact type.

In Figure 6, the worn head contact bar is denoted by dotted lines as in Figure 5, and the reformed head-free section is in full lines, the two shapes being superimposed upon each other to show how the three members of the bar must be altered relatively to each other in addition to reforming the fishing surfaces. The fishing surfaces 3 and 4 and the web member 7 are changed in angle, and the flange portion 5 is also changed in angle to provide rail base clearance. In practice I find that this re-shaping in addition to fishing surface reforming, causes such an unbalancing of lateral pressure that it is extremely difficult to attain lateral pressure balance by any angular positioning of the bar, but with the preliminary operation, such a balance may be finally obtained by angular positioning of the bar to the reforming pressure. Figure 5 then represents another application of my invention as a step in a method of reforming bars, and it may be applied wherever a preliminary re-shaping operation involving the fishing surfaces is considered desirable.

I claim:—

1. The method of reforming a rail joint bar of angle type which consists in heating the bar, and then subjecting it to a reforming pressure within an "open" die with the bar positioned so that its bottom fishing surface is at a greater angle to the line of said reforming pressure than the sum of the top and bottom fishing angles of the bar.

2. The method of reforming the top and bottom fishing surfaces of a rail joint bar of angle type which consists in heating the bar, and then subjecting its top and bottom members at least to a reforming pressure between top and bottom non-contacting die members with an open groove for the top member of the bar in one of the die members, and with the bar positioned so that the bottom fishing surface is at a greater angle to the line of said reforming pressure than the sum of the top and bottom fishing angles of the bar.

3. The method of reforming a rail joint bar of angle type which consists in heating the bar and then subjecting it to a reforming pressure between top and bottom die members one of which members has an open die groove for the top member of the bar and both fishing surfaces with the bar positioned so that the bottom fishing surface is at a greater angle to the line of said reforming pressure than the sum of the top and bottom fishing angles, the top and bottom fishing surfaces being held to predetermined fishing height.

4. The method of reforming a rail joint bar of angle type which consists in heating the bar and then subjecting it to a reforming pressure between top and bottom die members one of which members has an undercut open die groove for the top member of the bar and both fishing surfaces with the bar positioned so that the bottom fishing surface is at a greater angle to the line or direction of said reforming pressure than the sum of the top and bottom fishing angles of the bar, the positioning of the bar being at such an angle to the direction of said reforming pressure as will insure approximately a lateral balance of the lateral reactions resulting from the application of said reforming pressure to various surfaces of the bar.

5. As a step in a method of reforming a rail joint bar, the same consisting in heating the bar and then subjecting its fishing surfaces at least to a reforming pressure within an open die with the bar positioned so that the bottom fishing surface is at a greater angle to the line of said reforming pressure than the sum of the top and bottom fishing angles of the bar.

6. The method of reforming a rail joint bar of head-contact type into a bar of head-free type which consists in heating the bar and subjecting its top and bottom members to a reforming pressure between top and bottom non-contacting die members with an open groove for the top member of the bar in one of the die members, and with the bar positioned so that the bottom fishing surface is at a greater angle to the line of said reforming pressure than the sum of the top and bottom fishing angles of the bar, then subjecting the partially reformed bar to another operation under reforming pressure to reform the top and bottom fishing surfaces of the bar.

7. The method of reforming a rail joint bar of angle type which consists first in heating the bar and then subjecting it to mechanical die pressure in a vertical direction only with the bar positioned with relation to the direction of such pressure at a greater angle than the sum of the top and bottom fishing angles of the bar whereby such angular positioning of the bar will cause lateral pressure balance.

8. The method of reforming a rail joint bar of angle type which consists first in heating the bar and then subjecting it to mechanical die pressure in a vertical direction only with the bar positioned with relation to the direction of such pressure at a greater angle than the sum of the top and bottom fishing angles of the bar whereby such angular positioning of the bar will cause lateral pressure balance, and the bar being also positioned with its top and bottom fishing surfaces confined to one and the same die thereby causing the fishing height of the bar to be accurately maintained.

GEORGE LANGFORD.